UNITED STATES PATENT OFFICE.

BERNHARD PRIEBS AND OSKAR KALTWASSER, OF BERLIN, GERMANY, ASSIGNORS TO THE ACTIEN-GESELLSCHAFT FÜR ANILIN FABRIKATION, OF SAME PLACE.

BLUISH-BLACK DYE.

SPECIFICATION forming part of Letters Patent No. 628,609, dated July 11, 1899.

Application filed April 8, 1899. Serial No. 712,255. (Specimens.)

*To all whom it may concern:*

Be it known that we, BERNHARD PRIEBS and OSKAR KALTWASSER, of Berlin, in the Kingdom of Prussia, German Empire, have invented new and useful Improvements in the Production of Bluish-Black Dyes; and we do hereby declare that the following is a full, clear, and exact description thereof, which will enable others skilled in the art to which it appertains to make and use the same.

We have discovered that by heating oxydinitrodiphenylaminsulfonic acid with sulfur and alkalisulfids a most valuable new black dyestuff is obtained.

The oxydinitrodiphenylaminsulfonic acid, which serves as starting product for the preparation of our new dye, is obtained by the interaction of dinitrochlor-benzene ($NO_2$: $NO_2$:$Cl = 1:3:4$) and amidophenolsulfonic acid, ($NH_2$:$OH$:$SO_3H = 1:4:3$.) The preparation of oxydinitrodiphenlyaminsulfonic acid is effected by heating equimolecular proportions of the components in alcoholic solution in the presence of an excess of sodium acetate for several hours in a vessel connected with a reflux condenser. On cooling, the sodium salt of the oxydinitrodiphenylaminsulfonic acid crystallizes from the solution in the shape of orange-colored leaflets.

In order to carry out our invention, we heat thirty parts, by weight, of sulfur together with seventy-five parts, by weight, of crystallized sodium sulfid and a small portion of water to about 115° centigrade. Into the fused mixture we introduce, while stirring, twenty-five parts, by weight, of the oxydinitrodiphenylamin sodium sulfonate. The temperature of the melt is carried to 130° or 140°, the stirring being continued. After some time the melt begins to become thick. It is then heated, preferably after being spread out on iron plates in the form of cakes, to about 160° centigrade until the mass is reduced to almost complete dryness. After cooling the mass is pulverized, and the powder obtained can be directly used for dyeing. It dissolves readily in water containing a small portion of alkalisulfid with a pure blue color. In fuming sulfuric acid of twenty per cent. anhydride it dissolves with a grayish-blue color. By the addition of ice to this solution a dark violet-black precipitate is formed. If a current of air is conducted through the aqueous solution of the dye, a dark precipitate begins to separate out after some time. On further introduction of air a blue-colored solution is formed.

Instead of introducing the sodium salt of oxydinitrodiphenylaminsulfonic acid into the mixture of sulfur and sulfid we may also mix all the materials in the cold and heat them together to the temperature aforementioned. Further, the quantities of sulfur and sodium sulfid in the above example may be varied within wide limits, and we do not confine ourselves to the figures given in the above example.

Our new dye produces on unmordanted cotton in an alkaline or salt bath black shades, which possess a fine bluish hue. Owing to the application of a sulfonic acid as starting product our new dye is easily soluble, dyes evenly, and the dye-baths remain clear and do not deposit insoluble matters during the dyeing process. The dyeing process may be effected without special precautions because the aqueous solution of our dye is not so readily oxidizable. By these properties it is distinguished from the dye obtained from oxydinitrodiphenylamin by means of sulfur and alkalisulfids described in United States Letters Patent No. 610,541. The aqueous solution of this latter dye is so easily oxidizable that it is necessary to avoid the contact of air with the cotton on and after dyeing to remove as quickly as possible the liquor remaining in the dyed cotton by rinsing, squashing, and washing, as otherwise uneven and stained colorations will result. Moreover the tints obtained with our new dye are more bluish.

Having now described our invention and in what manner the same can be performed, what we claim as new is—

The bluish-black dye which results from heating the sodium salt of oxydinitrodiphenylaminsulfonic acid

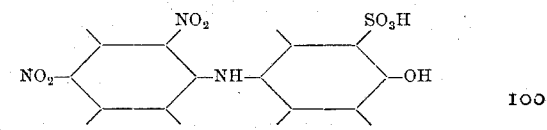

with sulfur and alkalisulfids; said dye being readily soluble in water with fine blue color; dissolving in fuming sulfuric acid of twenty per cent. anhydride with grayish-blue color, from which solution on addition of ice a dark violet precipitate is separated; the aqueous solution yielding by the introduction of a current of air after some time a precipitate, while on further introduction of air a blue solution is formed; said dye producing on unmordanted cotton in an alkaline bath bluish-black shades of remarkable intensity and fastness.

In witness whereof we have hereunto signed our names, this 22d day of March, 1899, in the presence of two subscribing witnesses.

BERNHARD PRIEBS.
OSKAR KALTWASSER.

Witnesses:
WOLDEMER HAUPT,
HENRY HASPER.